(12) United States Patent
Moore et al.

(10) Patent No.: US 8,735,510 B2
(45) Date of Patent: May 27, 2014

(54) POLYMER COMPOSITION

(75) Inventors: Theodore Moore, Cumming, GA (US); Mark G. Reichmann, Roswell, GA (US); Marco Avataneo, Senago (IT); Giuseppe Marchionni, Milan (IT)

(73) Assignee: Solvay SA, Brussels (BE)

( * ) Notice: Subject to any disclaimer, the term of this patent is extended or adjusted under 35 U.S.C. 154(b) by 243 days.

(21) Appl. No.: 13/202,550

(22) PCT Filed: Feb. 22, 2010

(86) PCT No.: PCT/EP2010/052199
§ 371 (c)(1),
(2), (4) Date: Aug. 19, 2011

(87) PCT Pub. No.: WO2010/097363
PCT Pub. Date: Sep. 2, 2010

(65) Prior Publication Data
US 2011/0297880 A1    Dec. 8, 2011

Related U.S. Application Data

(60) Provisional application No. 61/155,541, filed on Feb. 26, 2009.

(51) Int. Cl.
*C08L 71/02*    (2006.01)

(52) U.S. Cl.
USPC .......................................... 525/509; 525/527

(58) Field of Classification Search
USPC ......................................................... 525/509
See application file for complete search history.

(56) References Cited

U.S. PATENT DOCUMENTS

| | | | |
|---|---|---|---|
| 3,441,538 A | 4/1969 | Marks | |
| 3,442,857 A | 5/1969 | Thornton | |
| 3,516,966 A | 6/1970 | Berr | |
| 3,715,378 A * | 2/1973 | Sianesi et al. | 28/835.8 |
| 3,810,875 A * | 5/1974 | Rice et al. | 28/393 |
| 3,882,193 A * | 5/1975 | Rice et al. | 528/271 |
| 4,396,755 A | 8/1983 | Rose | |
| 4,816,556 A | 3/1989 | Gay et al. | |
| 4,946,936 A * | 8/1990 | Moggi et al. | 528/392 |
| 5,143,963 A | 9/1992 | Sterling et al. | |
| 6,087,430 A | 7/2000 | Sterling et al. | |
| 6,160,051 A * | 12/2000 | Tatsu et al. | 525/90 |
| 7,355,816 B1 | 4/2008 | Hiller | |
| 8,258,090 B2 * | 9/2012 | Avataneo et al. | 508/582 |
| 2010/0144955 A1 * | 6/2010 | El-Hibri et al. | 524/514 |

FOREIGN PATENT DOCUMENTS

| | | |
|---|---|---|
| JP | 60104161 A | 6/1985 |
| JP | 61254663 A | 11/1986 |
| JP | 63264672 A | 11/1988 |
| JP | 02140255 A | 5/1990 |
| JP | 06304469 A | 11/1994 |
| JP | 20060143761 A | 6/2006 |
| WO | WO 2007006646 A1 | 1/2007 |
| WO | WO 2007065867 A1 | 6/2007 |
| WO | WO 2007065880 A2 | 6/2007 |
| WO | WO 2007102963 A1 | 9/2007 |
| WO | WO2008065163 A1 | 6/2008 |
| WO | WO 2008065164 A1 | 6/2008 |
| WO | WO 2008116939 A2 | 10/2008 |

OTHER PUBLICATIONS

Standard ASTM D648—"Standard Test Method for Deflection Temperature of Plastics Under Flexural Load in the Edgewise Position", ASTM International, A00510902 2006, p. 1-13; 13 pgs.

* cited by examiner

*Primary Examiner* — Mike M Dollinger
(74) *Attorney, Agent, or Firm* — Osha Liang LLP

(57) ABSTRACT

A polymer composition comprising: at least one polycondensation polymer having a heat deflection temperature (HDT) of above 80° C. under a load of 1.82 MPa when measured according to ASTM D648 [polymer (P)]; at least one perfluoropolyether block copolymer [polymer (F)] comprising: A) one or more (per)fluoropolyoxyalkylene segment (chain $R_f$) comprising recurring units having at least one catenary ether bond and at least one fluorocarbon moiety, and B) one or more polyalkylene segment (chain $R_a$) comprising recurring units of formula: —($CR_1R_2$—$CR_3R_4$)—; wherein $R_1$, $R_2$, $R_3$, $R_4$, equal to or different from each other, are selected from the group consisting of H, halogens; $C_1$-$C_6$ (hydro)carbon groups, optionally containing fluorine or other heteroatoms, to a process for its manufacture and to its use for manufacturing shaped articles, in particular by extrusion molding or injection molding techniques.

14 Claims, No Drawings

POLYMER COMPOSITION

CROSS REFERENCE TO RELATED APPLICATIONS

This application is a U.S. national stage entry under 35 U.S.C. §371 of International Application No. PCT/EP2010/052,199 filed Feb. 22, 2010, which claims priority to U.S. provisional application No. 61/155541, filed Feb. 26, 2009, the whole content of which is herein incorporated by reference for all purposes.

TECHNICAL FIELD

The invention pertains to a polymer composition having improved processability behaviour at high temperature and high shear rate, to a process for its manufacture and to its use for the manufacture of shaped articles.

BACKGROUND

High performance plastics, in particular polysulfone polymers, thanks to their attractive properties, are currently used for the manufacture of several parts and articles intended to deliver outstanding mechanical properties in severe conditions.

Among processing technologies used for the manufacture of final parts, said polymers are often extrusion molded; more particularly, for the manufacture of sheets and profiles, molten material is extruded from a die and pulled out through appropriate rolls or dies so as to achieve required thickness. Melt strength, i.e. tensile strength of the polymer when in molten state so as to avoid melt fractures and failures, is thus a key property. High molecular weight plastics, in particular high molecular weight polysulfones, are generally understood to comply with these requirements; nevertheless, processability of these high molecular weight materials is relatively poor, limiting throughputs and production rates.

While processing temperature might improve melt flowability, these conditions may lead to degradation and black speck formation.

Traditional flow modifiers, such as MFA, PFA, PTFE or LLDPE, generally require high concentrations to be effective: at these high concentrations, these additives are not compatible in the blend, so that non-homogenous mixtures are obtained, whose performance are negatively affected. Also, certain additives (e.g. LLDPE) are not thermally stable in processing conditions of said high performance plastics.

In the past, perfluoropolyether-based additives have already been suggested for high performances plastics. In particular, JP 63264672 (NTN-RULON INDUSTRIES) Jan. 11, 1988 discloses a lubricating compositions for synthetic resins (e.g. polysulfone resins) comprising a perfluoropolyether compound, for improvement of wear/abrasion resistance. Also, U.S. Pat. No. 7,355,816 (MAXTOR CORPORATION) Aug. 4, 2008 discloses thermoplastic polymer compositions based on high performance materials (e.g. polyetherimides, polyphenylensulfides, polysufones) comprising PTFE and/or perfluoropolyether lubricants for reducing wear.

Nevertheless, these perfluoropolyether additives were not investigated for their performances as melt flow modifiers and were not proven to provide any of such effects in taught compositions.

There is thus a current shortfall in the art for flow modifiers for high performance plastics which can override above mentioned problems, which are able to withstand processing temperatures without undergoing degradation phenomena, and which can effectively improve processability and melt flow behaviour of said plastics, without negatively affecting their mechanical performances.

SUMMARY OF THE INVENTION

It is thus an object of the present invention a polymer composition comprising:
at least one polycondensation polymer having a heat deflection temperature (HDT) of above 80° C. under a load of 1.82 MPa when measured according to ASTM D648 [polymer (P)];
at least one perfluoropolyether block copolymer [polymer (F)] comprising:
A) one or more (per)fluoropolyoxyalkylene segment (chain $R_f$), that is to say a segment comprising recurring units having at least one catenary ether bond and at least one fluorocarbon moiety, and
B) one or more polyalkylene segment (chain $R_a$) comprising recurring units of formula:

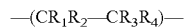

wherein $R_1$, $R_2$, $R_3$, $R_4$, equal to or different from each other, are selected from the group consisting of H, halogens (preferably F, Cl); $C_1$-$C_6$ (hydro)carbon groups, optionally containing fluorine or other heteroatoms, preferably perfluoroalkyl or (per)fluorooxyalkyl.

The Applicant has found that the incorporation of the polymer (F) as above detailed in said high performance plastics successfully enables achievement of improved melt flowability, significantly enhancing processability especially at low shear rates, without affecting mechanical properties of polymer (P) hosts nor undergoing decomposition/degradation phenomena at processing conditions of said polymer (P).

The (per)fluoropolyoxyalkylene segment (chain $R_f$) is preferably a chain comprising recurring units ($R_1$), said recurring units having general formula: —(CF$_2$)$_k$—CFZ—O—, wherein k is an integer of from 0 to 3 and Z is selected between a fluorine atom and a $C_1$-$C_6$ perfluoro(oxy)alkyl group.

Chain $R_f$ more preferably complies with formula:

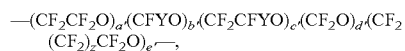

the recurring units being statistically distributed along the (per)fluoropolyoxyalkylene chain, wherein:
Y is a $C_1$-$C_5$ perfluoro(oxy)alkyl group;
z is 1 or 2;
a', b', c', d', e' are integers ≥0.

Most preferably, chain $R_f$ complies with formula:

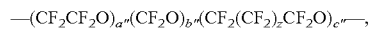

wherein:
z is 1 or 2;
a", b", c" are integers ≥0.

Polymer (F) typically complies with formula:

$$T_fO\text{-}[A\text{-}B]_z\text{-}[A\text{-}B']_{z'}\text{-}A\text{-}T_f' \qquad \text{(formula I)}$$

wherein:
, wherein A' is a chain $R_f$ as above detailed; X, X', equal to or different from each other, are selected from —CF$_2$—, —CF$_2$CF$_2$—, —CF(CF$_3$)—; a, b, equal to or different from each other, are integers equal to 0 or 1, with the proviso that the block A linked to the end group $T_f$-O— has a=1 and the block A linked to the end group $T'_f$ has b=0;

B is a segment of recurring units derived from one or more olefins having formula:

 (formula Ia), wherein: j is an integer from 1 to 100, j' is an integer from 0 to 100 with the proviso that (j+j') is higher than 2 and lower than 100; $R_1, R_2, R_3, R_4, R_5, R_6, R_7, R_8$, equal to or different from each other, are selected from halogen (preferably F, Cl); H; $C_1$-$C_6$ groups, optionally containing F or other heteroatoms, preferably perfluoroalkyl or (per)fluorooxyalkyl, said substituents $R_1$-$R_8$ optionally containing one or more functional groups;

z is an integer higher than or equal to 2; z' is ≥0; z, z' are such that the number average molecular weight of the polymer (F) of formula (I) is in the range 500-500,000;

B' is a segment otherwise complying with formula (Ia), but having at least one of the substituents $R_1$ to $R_8$ different than those in block B;

$T_l$ and $T_l'$ equal to or different from each other, are selected from H, halogen, $C_1$-$C_3$ (per)fluoroalkyls, $C_{1-6}$ alkyls and $C_1$-$C_{30}$ functional end groups comprising heteroatoms chosen among O, S, N.

Said products can be produced by reacting (per)fluoropolyethers comprising peroxide groups with (fluoro)olefins, as detailed in patent application WO 2008/065163 (SOLVAY SOLEXIS S.P.A.) 5 Jun. 2008 and WO 2008/065164 (SOLVAY SOLEXIS S.P.A.) 5 Jun. 2008.

Preferably, $T_l$ and $T_l'$ equal to or different from each other, are selected from the group consisting of:

(j) —Y', wherein Y' is chain end chosen among —H, halogen, such as —F, —Cl, $C_1$-$C_3$ perhalogenated alkyl group, such as —$CF_3$, —$C_2F_5$, —$CF_2Cl$, —$CF_2CF_2Cl$;

(jj) -$E_r$-$A_q$-Y"$_k$, wherein k, r and q are integers, with q=0 or 1, r=0 or 1, and k between 1 and 4, preferably between 1 and 2, E denotes a functional linking group comprising at least one heteroatom chosen among O, S, N; A denotes a $C_1$-$C_{20}$ bivalent linking group; and Y" denotes a functional end-group.

The functional group E may comprise an amide, ester, carboxylic, thiocarboxylic, ether, heteroaromatic, sulfide, amine, and/or imine group.

Non limitative examples of functional linking groups E are notably —CONR— (R=H, $C_1$-$C_{15}$ substituted or unsubstituted linear or cyclic aliphatic group, $C_1$-$C_{15}$ substituted or unsubstituted aromatic group); —COO—; —COS—; —CO—; an heteroatom such as —O—; —S—; —NR'— (R=H, $C_1$-$C_{15}$ substituted or unsubstituted linear or cyclic aliphatic group, $C_1$-$C_{15}$ substituted or unsubstituted aromatic group); a 5- or 6-membered aromatic heterocycle containing one or more heteroatoms chosen among N, O, S, the same or different each other, in particular triazines, such as

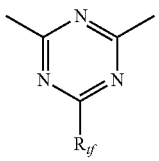

with Rtf being a perfluoroalkyl group, e.g. —$CF_3$.

The bivalent $C_1$-$C_{20}$ linking group A is preferably selected from the following classes:

1. linear substituted or unsubstituted $C_1$-$C_{20}$ alkylenic chain, optionally containing heteroatoms in the alkylenic chain; preferably linear aliphatic group comprising moieties of formula —$(CH_2)_m$—, with m integer between 1 and 20, and optionally comprising amide, ester, ether, sulfide, imine groups and mixtures thereof;

2. (alkylene)cycloaliphatic $C_1$-$C_{20}$ groups or (alkylen)aromatic $C_1$-$C_{20}$ groups, optionally containing heteroatoms in the alkylenic chain or in the ring, and optionally comprising amide, ester, ether, sulfide, imine groups and mixtures thereof;

3. linear or branched polyalkylenoxy chains, comprising in particular repeating units selected from: —$CH_2CH_2O$—, —$CH_2CH(CH_3)O$—, —$(CH_2)_3O$—, —$(CH_2)_4O$—, optionally comprising amide, ester, ether, sulfide, imine groups and mixtures thereof.

Examples of suitable functional groups Y" are notably —OH, —SH, —OR', —SR', —$NH_2$, —NHR', —$NR'_2$, —COOH, —$SiR'_dQ_{3-d}$, —CN, —NCO, epoxy group —(CH—CH2-O—), 1,2- and 1,3-diols as such or as cyclic acetals and ketals (e.g., dioxolanes or dioxanes), —COR', —$CH(OCH_3)_2$, —CH(OH)$CH_2OH$, —$CH(COOH)_2$, —$CH(COOR')_2$, —$CH(CH_2OH)_2$, —$CH(CH_2NH_2)_2$, —$PO(OH)_2$, —CH$(CN)_2$, wherein R' is an alkyl, cycloaliphatic or aromatic substituted or unsubstituted group, optionally comprising one or more fluorine atoms, Q is OR', R' having the same meaning as above defined, d is an integer between 0 and 3.

One or more functional end-groups Y" can be linked to the group A and/or E: for instance, when A is an (alkylen)aromatic $C_1$-$C_{20}$ group, it is possible that two or more Y" groups are linked to the aromatic ring of the group A.

More preferably, the polymer (F) complies with formula (I) here above, wherein $T_l$ and $T_l'$, equal to or different from each other, are selected from the group consisting of: —H; halogen such as —F and —Cl; $C_1$-$C_3$ perhalogenated alkyl group, such as —$CF_3$, —$C_2F_5$, —$CF_2Cl$, —$CF_2CF_2Cl$; —$CH_2OH$; —$CH_2(OCH_2CH_2)_n OH$ (n being an integer between 1 and 3); —C(O)OH; —C(O)$OCH_3$; —CONH—$R_H$—$OSi(OC_2H_5)_3$ (where $R_H$ is a $C_1$-$C_{10}$ alkyl group); —$CONHC_{18}H_{37}$; —$CH_2OCH_2CH(OH)CH_2OH$; —$CH_2O(CH_2CH_2O)_n$—PO$(OH)_2$ (with n* between 1 and 3); and mixtures thereof.

In formula I here above, block B derives from one or more olefins polymerizable by radical route; among those olefins mention can be made of tetrafluoethylene (TFE), ethylene (E), vinylidene fluoride (VDF), chlorotrifluoroethylene (CTFE), hexafluoropropylene (HFP), (per)fluoroalkylvinylethers, (per)fluoroalkoxyalkylvinylethers.

Similarly, block B' derives from one or more olefins polymerizable by radical route, at least one of which is different from olefin(s) of block B. Olefins as above indicated for block B are suitable for being used for block B'.

It is generally preferred that block B and B' (when this latter is present) comprise recurring units derived from perfluorinated olefins.

Particularly preferred to the purpose of the invention is a polymer (F) complying with formula (I) here above, wherein z' is zero, j' is zero and each of $R_1, R_2, R_3, R_4$ are fluorine atoms, that is to say, wherein block B is derived from tetrafluoethylene and block B' is absent.

Thus, most preferred polymer (F) complies with formula:

$T_l$-O-[A-B]$_z$-A-$T_l'$ (formula I)

wherein:
A=—(X)$_a$—O-A'-(X')$_b$—, wherein X, a and b have the meanings above defined and A' is a chain $R_f$ of formula:

wherein: z* is 1 or 2; a+, b+, c+ are integers 0;
B is a segment of formula 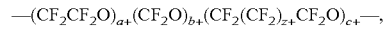 wherein: j+ is an integer from 2 to 100;

$T_j$ and $T_j'$, equal to or different from each other, are selected from the group consisting of: —H; halogen such as —F and —Cl; $C_1$-$C_3$ perhalogenated alkyl group, such as —$CF_3$, —$C_2F_5$, —$CF_2Cl$, —$CF_2CF_2Cl$.

The polymer composition of the invention advantageously comprises polymer (F) in an amount of at least 0.05% wt, preferably at least 0.1% wt, most preferably at least 0.25% wt, with respect to the total weight of polymer (F) and polymer (P).

The polymer composition of the invention advantageously comprises polymer (F) in an amount of at most 15% wt, preferably at most 10% wt, most preferably at most 5% wt, even more preferably at most 2% wt, with respect to the total weight of polymer (F) and polymer (P).

Compositions comprising polymer (F) in an amount of 0.5 to 2% wt, with respect to the total weight of polymer (F) and polymer (P), gave particularly good results.

High performance plastics suitable for the compositions of the invention are as mentioned above polycondensation polymers that have a heat deflection temperature (HDT) of above 80° C. under a load of 1.82 MPa when measured according to ASTM D648 [polymers (P)]. Typical heat deflection temperatures of certain high performance plastics are listed in Table 1.

TABLE 1

| Polycondensation Polymer | Heat Deflection Temperature (° C.) |
| --- | --- |
| Polysulfone (PSU) | 174 |
| Polyethersulfone (PES) | 203 |
| Polyphenylsulfone | 204 |
| Polyphthalamide | 120 |
| Polyamideimide | 278 |
| Liquid crystalline polymers (LCP) | 180-310 |
| Polyimide | 360 |
| Polyetherimide | 200 |
| Polyetheretherketone (low flow) | 160 |
| Polyetheretherketone (high flow) | 171 |
| Polyphenylene sulfide | 135 |
| Polycarbonate | 132 |

Heat deflection temperatures of polymer (P) can be determined according to ASTM D648, Method A, using a span of 4 inches. The polymer is injection molded into plaques that are 5 inches long, ½ inch wide, and ⅛ inch thick. The plaques are immersed in a suitable liquid heat-transfer medium, such as oil, during the HDT test. Dow Corning 710 silicone oil, for example, can be used.

High performance plastics useful herein include, but are not limited to, aromatic polyimides (PI), in particular polyester-imides (PEI) and polyamide-imides (PAI), polyaryletherketones (PAEK), such as polyetheretherketone (PEEK) and polyetherketoneketone (PEKK), liquid crystal polymers (LCP), and aromatic sulfone polymers (SP). Preferably, the high performance polymer [polymer (P)] is an aromatic sulfone polymer (SP).

To the purpose of the present invention, "aromatic polyimide (PI)" is intended to denote any polymer comprising recurring units, more than 50 wt. % of said recurring units comprising at least one aromatic ring and at least one imide group, as such (formula 1A) or in its amic acid form (formula 1B) [recurring units ($R_{PI}$)]:

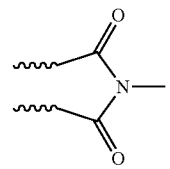

formula 1A

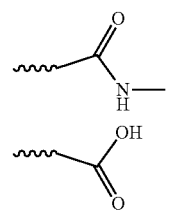

formula 1B

The imide group, as such or in its corresponding amic acid form, is advantageously linked to an aromatic ring, as illustrated below:

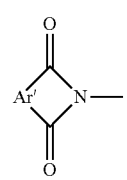

formula 2A

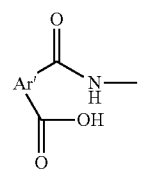

formula 2B whereas Ar' denotes a moiety containing at least one aromatic ring.

The imide group is advantageously present as condensed aromatic system, yielding a five- or six-membered heteroaromatic ring, such as, for instance, with benzene (phthalimide-type structure, formula 3) and naphthalene (naphthalimide-type structure, formula 4).

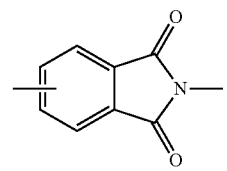

formula 3

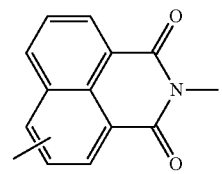

formula 4

The formulae here below depict examples of recurring units ($R_{PI}$) (formulae 5A to 5C):

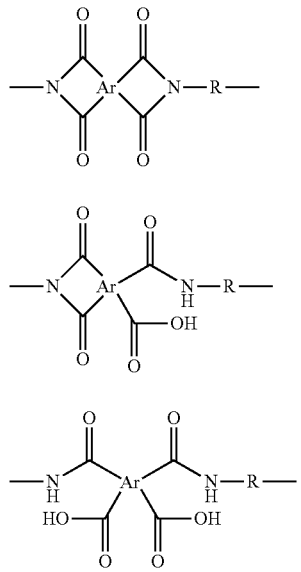

formula 5A formula 5B formula 5C wherein:

Ar represents an aromatic tetravalent group; typically Ar is selected from the group consisting of following structures:

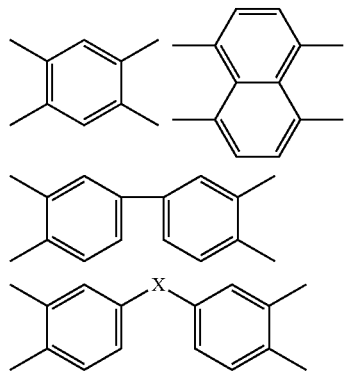

and corresponding optionally substituted structures, with X being —O—, —C(O)—, —CH$_2$—, —C(CF$_3$)$_2$—, —(CF$_2$)$_n$—, with n being an integer from 1 to 5;

R represents an aromatic divalent group; typically R is selected from the group consisting of following structures:

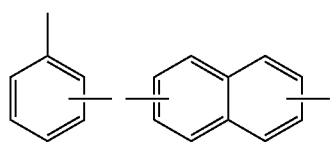

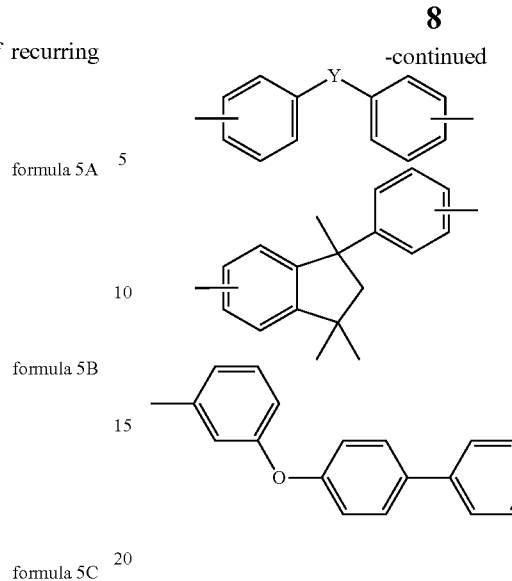

and corresponding optionally substituted structures, with Y being —O—, —S—, —SO$_2$—, —CH$_2$—, —C(O)—, —C(CF$_3$)$_2$—, —(CF$_2$)$_n$, n being an integer from 0 to 5.

Polyimides commercialized by DuPont as VESPEL® polyimides or by Mitsui as AURUM® polyimides are suitable for the purpose of the invention.

The recurring units ($R_{PI}$) of the aromatic polyimide can comprise one or more functional groups other than the imide group, as such and/or in its amic acid form. Non limitative examples of polymers complying with this criterion are aromatic polyetherimides (PEI), aromatic polyesterimides and aromatic polyamide-imides (PAI).

To the purpose of the present invention, "aromatic polyesterimide" is intended to denote any polymer more than 50 wt. % of the recurring units comprise at least one aromatic ring, at least one imide group, as such and/or in its amic acid form, and at least one ester group [recurring units ($R_{PEI}$)]. Typically, aromatic polyesterimides are made by reacting at least one acid monomer chosen from trimellitic anhydride and trimellitic anhydride monoacid halides with at least one diol, followed by reaction with at lest one diamine.

To the purpose of the present invention, "aromatic polyamide-imide (PAI)" is intended to denote any polymer comprising more than 50 wt. % of recurring units comprising at least one aromatic ring, at least one imide group, as such and/or in its amic acid form, and at least one amide group which is not included in the amic acid form of an imide group [recurring units ($R_{PAI}$)].

The recurring units ($R_{PAI}$) are advantageously chosen among:

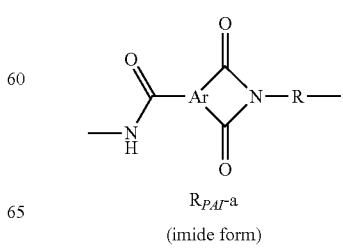

$R_{PAI}$-a
(imide form)

-continued

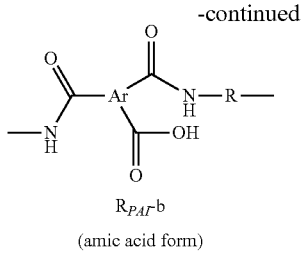

$R_{PAI}$-b
(amic acid form)

wherein:
Ar is a trivalent aromatic group; typically Ar is selected from the group consisting of following structures:

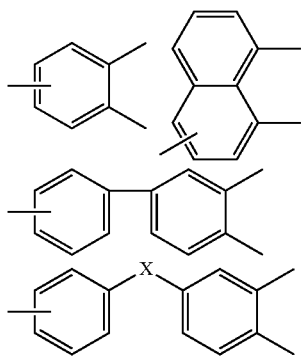

and corresponding optionally substituted structures, with X being —O—, —C(O)—, —CH$_2$—, —C(CF$_3$)$_2$—, —(CF$_2$)$_n$—, with n being an integer from 1 to 5;
R is a divalent aromatic group; typically R is selected from the group consisting of following structures:

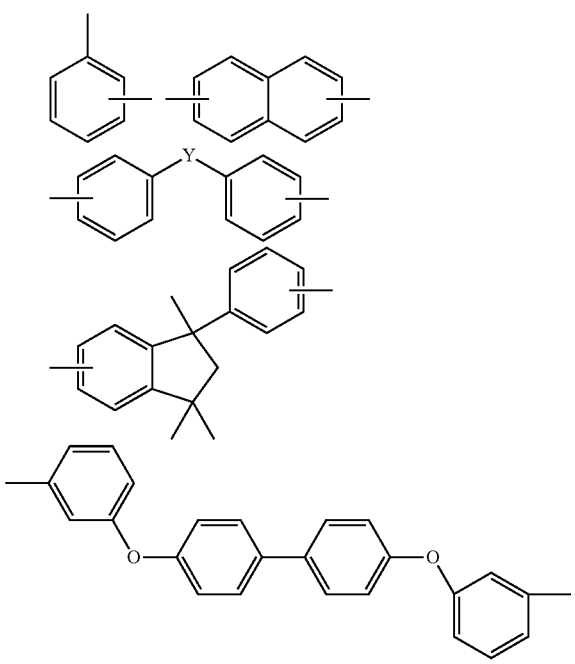

and corresponding optionally substituted structures, with Y being —O—, —S—, —SO$_2$—, —CH$_2$—, —C(O)—, —C(CF$_3$)$_2$—, —(CF$_2$)$_n$—, n being an integer from 0 to 5.
Preferably, the aromatic polyamide-imide comprises more than 50% of recurring units ($R_{PAI}$) comprising an imide group in which the imide group is present as such, like in recurring units ($R_{PAI}$-a), and/or in its amic acid form, like in recurring units ($R_{PAI}$-b).

Recurring units ($R_{PAI}$) are preferably chosen from recurring units (l), (m) and (n), in their amide-imide (a) or amide-amic acid (b) forms:

(l)

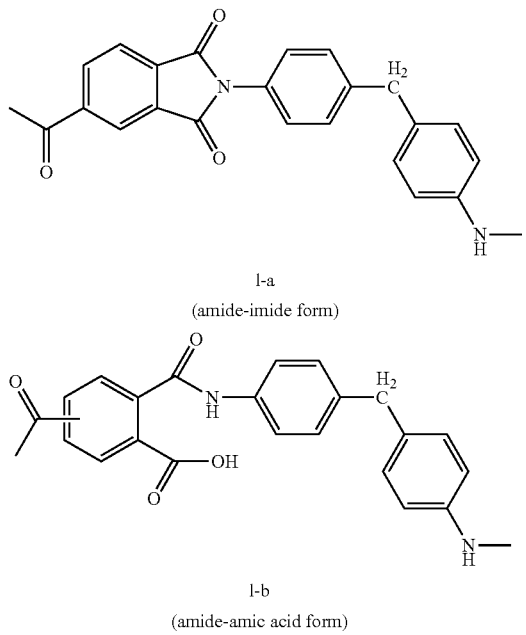

l-a
(amide-imide form)

l-b
(amide-amic acid form)

wherein the attachment of the two amide groups to the aromatic ring as shown in (I-b) will be understood to represent the 1,3 and the 1,4 polyamide-amic acid configurations;

(m)

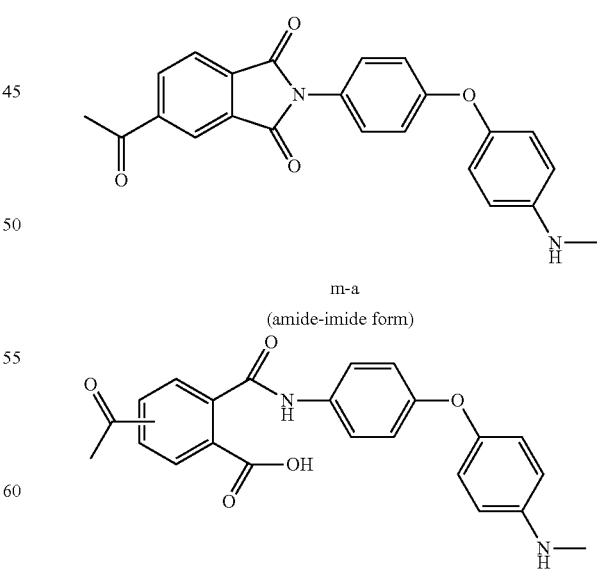

m-a
(amide-imide form)

m-b
(amide-amic acid form)

wherein the attachment of the two amide groups to the aromatic ring as shown in (m-b) will be understood to represent the 1,3 and the 1,4 polyamide-amic acid configurations; and

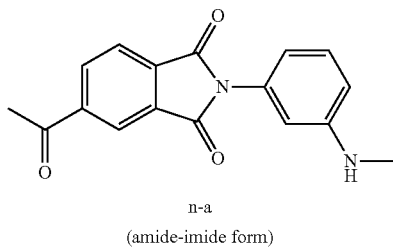

n-a
(amide-imide form)

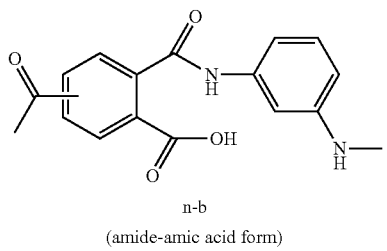

n-b
(amide-amic acid form)

wherein the attachment of the two amide groups to the aromatic ring as shown in (n-b) will be understood to represent the 1,3 and the 1,4 polyamide-amic acid configurations.

Very preferably, the aromatic polyamide-imide comprises more than 90 wt. % of recurring units ($R_{PAI}$). Still more preferably, it contains no recurring unit other than recurring units ($R_{PAI}$). Polymers commercialized by Solvay Advanced Polymers, L.L.C., as TORLON® polyamide-imides comply with this criterion.

The aromatic polyamide-imide can be notably manufactured by a process including the polycondensation reaction between at least one acid monomer chosen from trimellitic anhydride and trimellitic anhydride monoacid halides and at least one comonomer chosen from diamines and diisocyanates.

Among the trimellitic anhydride monoacid halides, trimellitic anhydride monoacid chloride is preferred.

The comonomer comprises preferably at least one aromatic ring. Besides, it comprises preferably at most two aromatic rings. More preferably, the comonomer is a diamine. Still more preferably, the diamine is chosen from the group consisting of 4,4'-diaminodiphenylmethane, 4,4'-diaminodiphenylether, m-phenylenediamine and mixtures thereof.

For the purpose of the invention, the term "polyaryletherketone (PAEK)" is intended to denote any polymer, comprising recurring units ($R_{PAEK}$), more than 50 wt. % of said recurring units are recurring units (k-A), (k-B) and/or (k-C):

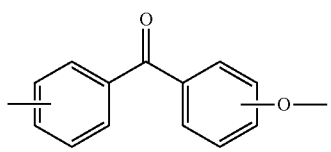

(k-A)

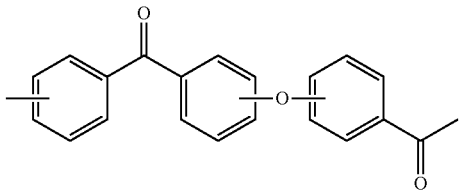

(k-B)

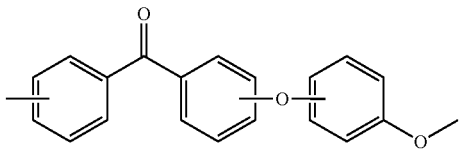

(k-C)

wherein the attachment of the ketone and/or ether groups to the aromatic ring as shown in (k-A), (k-B) and (k-B) will be understood to represent, independently at each occurrence, each of the possible ortho, meta and para configurations.

Preferably at least 70 wt. %, more preferably at least 80 wt. % of the recurring units ($R_{PAEK}$) of the polyaryletherketone (PAEK) suitable for the polymer composition of the invention are recurring units (k-A), (k-B) and/or (k-C). Most preferably polyaryletherketone (PAEK) comprises no recurring units other than recurring units (k-A), (k-B) and/or (k-C).

Polyaryletherketones (PAEK) are generally crystalline aromatic polymers, readily available from a variety of commercial sources. Methods for their preparation are well known, including the processes described for example in U.S. Pat. Nos. 3,441,538, 3,442,857, 3,516,966, 4,396,755 and 4,816,556. The polyaryletherketones (PAEK) have preferably reduced viscosities in the range of from about 0.8 to about 1.8 dl/g as measured in concentrated sulfuric acid at 25° C. and at atmospheric pressure.

Preferably the polyaryletherketone (PAEK) is chosen among polyetheretherketones (PEEK) and polyetherketoneketone (PEKK).

A polyetheretherketone (PEEK) is a polyaryletherketone (PAEK) wherein more than 50 wt. % of recurring units ($R_{PAEK}$) are recurring units (k-C).

A polyetherketoneketone (PEKK) is a polyaryletherketone (PAEK) wherein more than 50 wt. % of recurring units ($R_{PAEK}$) are recurring units (k-B).

Non limitative examples of commercially available polyaryletherketone (PAEK) resins suitable for the invention include the KETASPIRE® polyetheretherketone commercially available from Solvay Advanced Polymers and VICTREX® PEEK polyetheretherketone, from Imperial Chemicals, Inc., which are polymers, the recurring units of which are recurring units (k-c1):

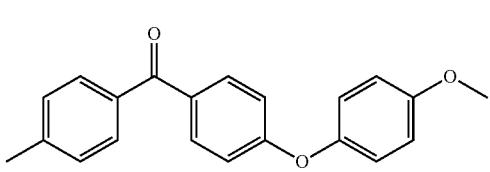

(k-c1)

The terms "liquid crystal polymers (LCP)" encompasses notably fully aromatic liquid crystalline polyesters.

Fully aromatic liquid crystalline polyesters can be produced in the melt by three main processes:
- direct esterification of optionally substituted phenols with aromatic carboxylic acids in the presence of catalysts such as titanium tetrabutyrate or dibutyl tin diacetate at high temperature;
- reaction between phenyl esters of aromatic carboxylic acids with relevant optionally substituted phenols;
- acidolysis of phenolic acetates with aromatic carboxylic acids.

Non limitative examples of commercially available fully aromatic liquid crystalline polyesters are notably VECTRA® LCP from Hoechst-Celanese and XYDAR® LCP from Solvay Advanced Polymers.

VECTRA® LCP is typically synthesized from 4-hydrobenzoic acid and 6-hydroxy-2-naphtoic acid; VECTRA® LCP is a polymer the recurring units of which are recurring units (Icp-A) and (Icp-B), typically in a ratio (Icp-A)/(Icp-B) of about 25/75:

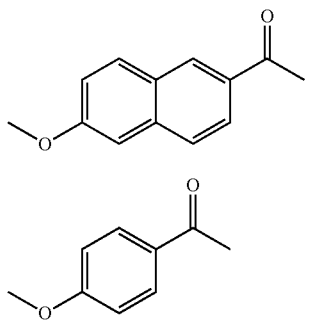

(Icp-A)

(Icp-B)

XYDAR® LCP is typically synthesized from 4-hydroxybenzoic acid, 4,4'-dihydroxy-1,1'-biphenyl, and terephtalic acid; the basic structure can be modified by using other monomers such as isophtalic acid or 4-aminobenzoic acid; XYDAR® LCP is generally a polymer the recurring units of which are recurring units (Icp-C), (Icp-D) and (Icp-B), typically in a ratio [(Icp-C)+(Icp-D)]/(Icp-B) of about ½:

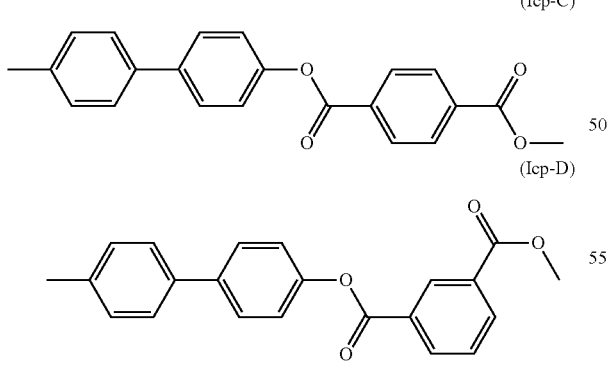

(Icp-C)

(Icp-D)

For the purpose of the invention, the term "polymer" is intended to denote any material consisting essentially of recurring units, and having a molecular weight above 2000.

For the purpose of the invention, the expression "aromatic sulfone polymer (SP)" is intended to denote any polymer, at least 50% wt of the recurring units thereof comprise at least one group of formula (SP) [recurring units ($R_{SP}$)]:

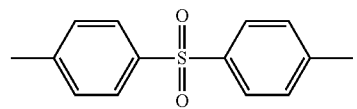

Formula (SP)

The aromatic sulfone polymer (P) has a glass transition temperature of advantageously at least 150° C., preferably at least 160° C., more preferably at least 175° C.

In a first preferred embodiment of the invention, at least 50% wt of the recurring units of aromatic sulfone polymer (SP) are recurring units ($R_{SP-1}$), in their imide form ($R_{SP-1}$-A) and/or amic acid forms [($R_{SP-1}$-B) and ($R_{SP-1}$-C)]:

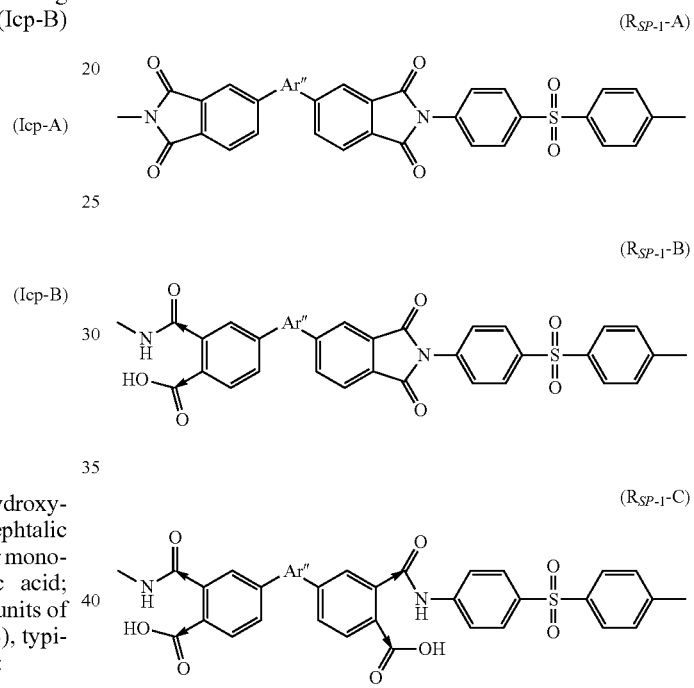

($R_{SP-1}$-A)

($R_{SP-1}$-B)

($R_{SP-1}$-C)

wherein:
- the → denotes isomerism so that in any recurring unit the groups to which the arrows point may exist as shown or in an interchanged position;
- Ar" is chosen among the following structures:

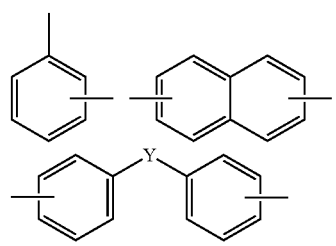

and corresponding optionally substituted structures, with Y being —O—, —C(O)—, —$(CH_2)_n$—, —$C(CF_3)_2$—, —$(CF_2)_n$—, with n being an integer from 1 to 5 and mixtures thereof.

In a second preferred embodiment of the invention, at least 50% wt of the recurring units of aromatic sulfone polymer (SP) are recurring units ($R_{SP-2}$) and/or recurring units ($R_{SP-3}$):

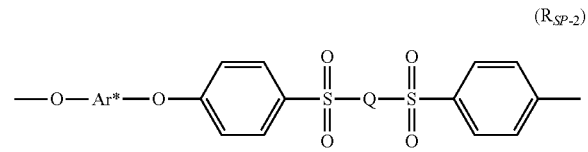
($R_{SP-2}$)

-continued ($R_{SP-3}$)

wherein:
Q and Ar*, equal or different from each other and at each occurrence, are independently a divalent aromatic group; preferably Ar* and Q equal or different from each other and at each occurrence, are independently selected from the group consisting of the following structures:

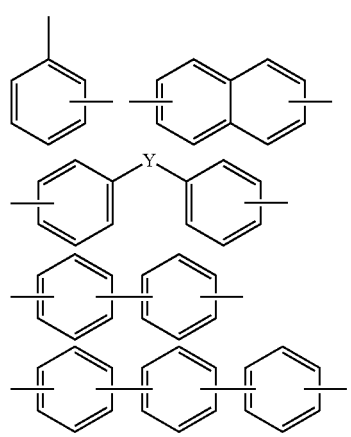

and corresponding optionally substituted structures, with Y being —O—, —CH=CH—, —C≡C—, —S—, —C(O)—, —(CH$_2$)$_n$—, —C(CF$_3$)$_2$—, —C(CH$_3$)$_2$—, —SO$_2$—, —(CF$_2$)$_n$—, with n being an integer from 1 to 5 and mixtures thereof; and mixtures thereof.

Recurring units ($R_{SP-2}$) are preferably chosen from:

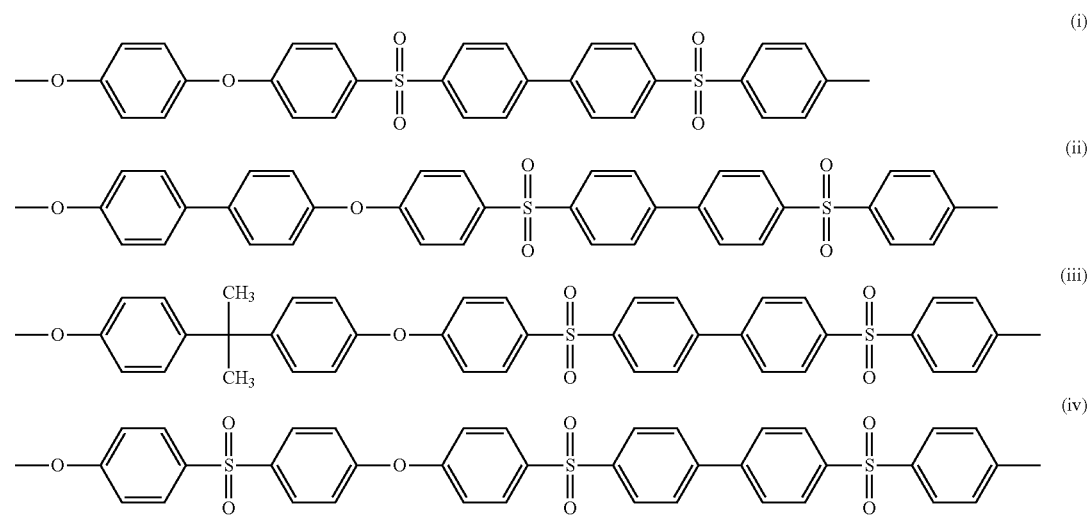

and mixtures thereof.

Recurring units ($R_{SP-3}$) are preferably chosen from:

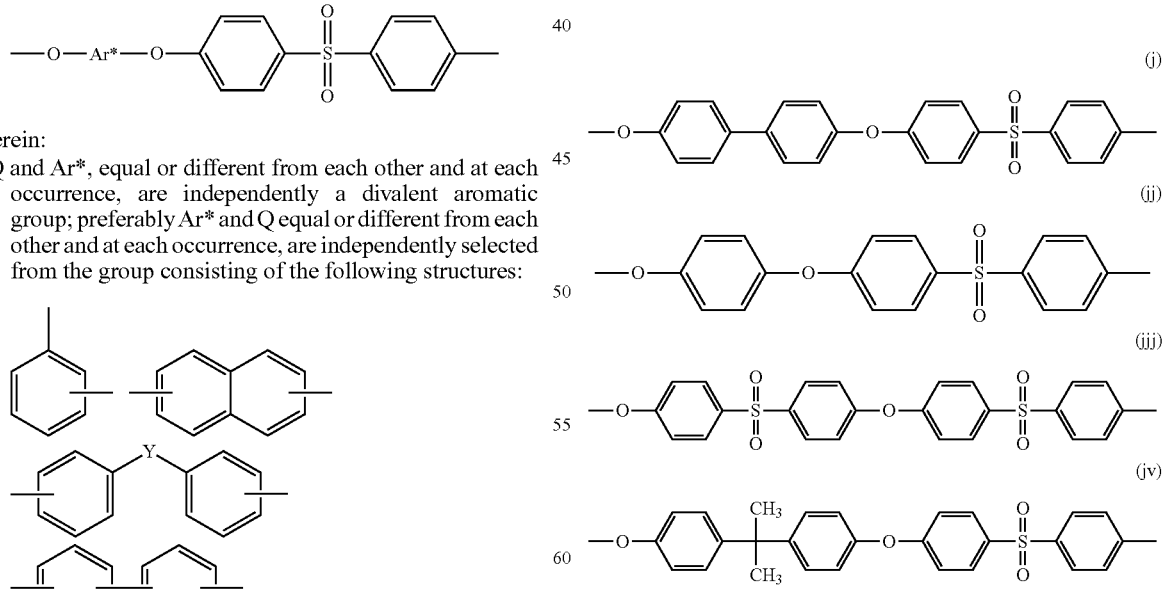

and mixtures thereof.

Aromatic sulfone polymer (SP) according to the second preferred embodiment of the invention comprises at least 50% wt, preferably 70% wt, more preferably 75% wt of recurring units ($R_{SP-2}$) and/or ($R_{SP-3}$), still more preferably, it contains no recurring unit other than recurring units ($R_{SP-2}$) and/or ($R_{SP-3}$).

Good results were obtained with aromatic sulfone polymer (P) the recurring units of which are recurring units (ii) (polybiphenyldisulfone, herein after), with aromatic sulfone polymer (P) the recurring units of which are recurring units (j) (polyphenylsulfone, hereinafter), with aromatic sulfone polymer (P) the recurring units of which are recurring units (jj) (polyetherethersulfone, hereinafter), with aromatic sulfone polymer (P) the recurring units of which are recurring units (jjj) and, optionally in addition, recurring units (jj) (polyethersulfone, hereinafter), and with aromatic sulfone polymer (P) the recurring units of which are recurring units (jv) (polysulfone, hereinafter).

Polyphenylsulfone is notably available as RADEL® R PPSU from Solvay Advanced Polymers, L.L.C. Polysulfone is notably available as UDEL® PSF from Solvay Advanced Polymers, L.L.C. Polyethersulfone is notably available as RADEL® A PES from Solvay Advanced Polymers, L.L.C.

Preferably, aromatic sulfone polymer (SP) is chosen among the group consisting of polybiphenyldisulfone, polysulfone, polyphenylsulfone, polyethersulfone, copolymers and mixtures thereof.

Optionally, the polymer composition of the invention can further comprise fillers, lubricating agents, flow modifiers, heat stabilizer, anti-static agents, extenders, reinforcing agents, organic and/or inorganic pigments like $TiO_2$, carbon black, antioxidants, flame retardants, smoke-suppressing agents.

Among flame retardants, mention can be made of PTFE; suitable PTFE are described notably in WO 2007/065867 (SOLVAY) 14 Jun. 2007 and WO 2007/065880 (SOLVAY) 14 Jun. 2007.

Additional flow modifiers can also be used in combination with polymer (F); among them mention can be notably made of fluoroelastomers and of thermoplastic tetrafluoroethylene (TFE)-perfluoroalkylvinylethers (PAVE) copolymers, in particular a TFE-perfluoromethylvinylether copolymer, like those commercially available under trade name HYFLON® from Solvay Solexis.

The composition of the invention can advantageously comprise at least one filler chosen from reinforcing fillers, structural fibers and mixtures thereof. Structural fibers may include glass fiber, carbon or graphite fibers, and fibers formed of silicon carbide, alumina, titania, boron and the like, and may include mixtures comprising two or more such fibers. Reinforcing fillers which can also be used in the composition of the invention include notably pigments, flake, spherical and fibrous particulate filler reinforcements and nucleating agents such as talc, mica, titanium dioxide, potassium titanate, silica, kaolin, chalk, alumina, mineral fillers, and the like. The reinforcing fillers and structural fibers can be used alone or in any combination.

Another aspect of the present invention concerns a process for manufacturing the polymer composition as above described, which comprises mixing:
 at least one polymer (P);
 at least one polymer (F).

Advantageously, the process of the invention comprises mixing by dry blending and/or melt compounding polymer (P) and polymer (F).

Preferably, polymer (P) and polymer (F) are mixed by melt compounding.

Advantageously, polymer (P) and polymer (F) are melt compounded in continuous or batch devices. Such devices are well-known to those skilled in the art.

Examples of suitable continuous devices to melt compound the polymer composition of the invention are notably screw extruders. Thus, polymer (P) and polymer (F) and, optionally, other ingredients, are advantageously fed in powder or granular form in an extruder and the composition is extruded into strands and the strands are chopped into pellets.

Optionally, fillers, lubricating agents, flow modifiers, heat stabilizer, anti-static agents, extenders, reinforcing agents, organic and/or inorganic pigments like $TiO_2$, carbon black, antioxidants, flame retardants, smoke-suppressing agents may be added to the composition during the compounding step.

Preferably, polymer (P) and polymer (F) are melt compounded in a twin-screw extruder.

The composition can be further processed following standard methods for injection molding, extrusion, thermoforming, machining, and blow molding. Solution-based processing for coatings and membranes is also possible. Finished articles comprising the composition as above described can undergo standard post-fabrication operations such as ultrasonic welding, adhesive bonding, and laser marking as well as heat staking, threading, and machining.

Another object of the invention is a shaped article comprising the polymer composition as above described.

Advantageously, the article is an injection molded article, an extrusion molded article, a shaped article, a coated article or a casted article. Preferably it is an extrusion molded article, like notably a sheet or a film.

The articles according to the invention can be fabricated by processing the composition as above described following standard methods.

The invention will be now described in more details with reference to the following examples, whose purpose is merely illustrative and not intended to limit the scope of the invention.

EXAMPLES

Preparative Example 1

Preparation of the Polymer (F) Additive

In a 1 liter glass flask, 600 g of GALDEN® HT230 perfluoropolyether solvent and 300 g of perfluoropolyether comprising peroxide moieties of formula: $X_O$—$O(CF_2CF_2O)_r$ $(CF_2O)_s(O)_t$—$X_O'$ wherein $X_O$ and $X_O'$ are: —$CF_3$ (29%), —$CF_2Cl$ (13%), —$CF_2CF_2Cl$ (20%), —COF (24%), —$CF_2COF$ (14%), with number average molecular weight=$5.8 \times 10^4$, r/s=1.25 and t/(r+s)=0.077, corresponding to a PO [defined as g of active oxygen/100 g of perfluoropolyether peroxide] equal to 1.3, were introduced.

The reaction mixture was heated under stirring under nitrogen flow (1 Nl h$^{-1}$) up to 190° C., temperature starting at which tetrafluoroethylene (TFE) was continuously fed (flow rate=8.5 Nl h$^{-1}$).

The mixture was maintained under stirring at 190° C. for 1.5 hours, then brought to 200° C. and maintained at this temperature for 1.5 hours and finally, heated at 210° C. for one hour. After having fed TFE so as to achieve a molar ratio between TFE fed and peroxidic moieties initially present of 7, monomer feeding was stopped and temperature increased up to 230° C. for 3 hours. The mixture was then cooled to room temperature to yield a homogeneous solution. Said solution was again heated at 180° C. and treated with nitrogen saturated with water (10 Nl h$^{-1}$) for 4 hours, then with anhydrous nitrogen (10 Nl h$^{-1}$) for 30 minutes and finally with fluorine (4 Nl h$^{-1}$) for 7 hours. Solvent GALDEN® HT230 was removed under vacuum ($10^{-1}$ mbar) until a maximum temperature of 230° C., yielding 330 g of a product which was characterized by $^{19}$F-NMR analysis as complying with formula:

  (I)

wherein

Q, Q' are —$CF_3$ (70% mol), —$CF_2Cl$ and —$CF_2CF_2Cl$ (30% mol),

B is —$[CF_2—CF_2]_j$ wherein j has a number average value equal to 6.7;

A is —$CF_2O—[(CF_2O)_n(CF_2CF_2O)_m(CF_2CF_2CF_2O)_p(CF_2CF_2CF_2CF_2O)_q]—(CF_2)_b—$ with values of m/n=1.08, p/n=0.014, q/n=0.020; (p+q)/(p+q+n+m)=0.016, wherein b=0 when A is linked to Q', b=1 in all the other cases.

The percentage by weight of the perfluorocarbon segments B in the compound of formula (I) was found to be equal to 21.4%. The number average molecular weight of the polymer resulted equal to $6.4 \times 10^4$, from which an average value of the index z=20 was calculated.

The DSC analysis showed a $T_g$ equal to −113° C. The analysis at DSC shows a melting ΔH of 3.1 J/g in the temperature range between 50 and 200° C. The obtained polymer was found to have by TGA analysis a loss by weight of 1% at 305° C. and of 2% at 362° C.

General Description of the Compounding Process:

A dry blend of RADEL® R PPSU or UDEL® PSF with the desired amount of polymer (F) additive (or other comparative additives) was first prepared by tumble blending. The preblended mixture was then fed into a Berstorff 25 mm twin screw extruder. The barrel temperatures of the extruder were maintained at 300-350° C. to give an adequate melt temperature. The screw speed was typically set at 180 rpm. The melt was extruded through a single hole die and the polymer strands were cooled using a water bath prior to pelletization. Composition, physical and mechanical properties of the RADEL®-R-based and UDEL®-based blends are summarized in table 2 and 3, respectively.

Capillary Rheology Test Method (Viscosity):

The viscosity of a melt was measured as a function of shear rate at several temperatures using an LCR-7000 Capillary Rheometer.

TABLE 3

| Run[14] | | Ex. 8C | Ex. 9 |
|---|---|---|---|
| additive | type | — | Ex. 1 |
| | (% wt) | — | 2% |
| Physical and mechanical properties | | | |
| MFR[5] | dg/min | 6.9 | 6.9 |
| $VR_{40}$[6] | | 1.18 | 1.10 |
| viscosity[7] | Pa·s | 427 | 439 |
| $T.S._y$[8] | kpsi | 10.8 ± 0.1 | 10.9 ± 0.1 |
| $\epsilon_y$[9] | % | 5.7 ± 0.1 | 5.6 ± 0.1 |
| $T.S._b$[10] | kpsi | 7.3 ± 0.1 | 7.8 ± 0.3 |
| $\epsilon_b$[11] | % | 33 ± 16 | 61 ± 17 |
| E[12] | kpsi | 353 ± 2 | 366 ± 5 |
| I.S.[15] | ft·lb/in | 1.058 ± 0.04 | 1.24 ± 0.06 |

[14]All compositions based on UDEL® PSF;

[5]-[12]as in table 1;

[15]Izod Impact Strength measured on specimens with a notch of 0.001'.

General Description of Sheet Extrusion Equipment:

After compounding the blended polymers were extruded through a sheet die to assess their utility in profile extrusion. The materials were extruded using a Sterling single screw extruder (2.5 inch screw diameter with 25:1 Length/Diameter ratio) through a 14 inch wide "T"-type die. The sheet (thickness ~4 mm) was run through a 3 roll cooling stack with hot oil temperature controlled rolls prior to being cut to a desired length. The thickness of the sheet was controlled by adjusting the height of the die. Results obtained for RADEL® R PPSU-based compositions comprising additive from Ex. 1 are summarized in table 4.

TABLE 2

| Run[1] | | Ex. 2C | Ex. 3 | Ex. 4 | Ex. 5C | Ex. 6C | Ex. 7C |
|---|---|---|---|---|---|---|---|
| additive | type | — | Ex. 1 | Ex. 1 | PFA[2] | MFA[3] | FKM[4] |
| | (% wt) | — | 1% | 2% | 2% | 2% | 2% |
| Physical and mechanical properties | | | | | | | |
| MFR[5] | dg/min | 17.5 | 18.4 | 18.8 | 18.1 | 18.2 | 18.0 |
| $VR_{40}$[6] | | 1.51 | 1.81 | 1.79 | 1.76 | 1.79 | 1.74 |
| viscosity[7] | Pa·s | 887 | 700 | 672 | 683 | 706 | 693 |
| $T.S._y$[8] | kpsi | 10.9 ± 0.1 | 10.7 ± 0.1 | 10.7 ± 0.1 | 10.8 ± 0.1 | 10.7 ± 0.1 | 10.5 ± 0.1 |
| $\epsilon_y$[9] | % | 7.8 ± 0.1 | 7.7 ± 0.1 | 7.7 ± 0.1 | 7.6 ± 0.3 | 7.7 ± 0.2 | 7.7 ± 0.1 |
| $T.S._b$[10] | kpsi | 9.4 ± 0.5 | 9.3 ± 0.2 | 8.8 ± 0.3 | 10.4 ± 0.9 | 9.2 ± 0.8 | 9.0 ± 0.6 |
| $\epsilon_b$[11] | % | 61 ± 8 | 61 ± 3 | 36 ± 20 | 78 ± 15 | 49 ± 20 | 49 ± 14 |
| E[12] | kpsi | 318 ± 2 | 315 ± 2 | 315 ± 4 | 320 ± 8 | 315 ± 4 | 311 ± 3 |
| I.S.[13] | ft·lb/in | 2.26 ± 0.08 | 2.75 ± 0.23 | 2.27 ± 0.11 | 2.49 ± 0.13 | 2.68 ± 0.07 | 3.30 ± 0.29 |

[1]All compositions based on RADEL® R PPSU;

[2]HYFLON® PFA P7010;

[3]HYFLON® MFA 1041;

[4]TECNOFLON® NM FKM;

[5]Melt flow rate at 365° C., under a piston load of 5.0 kg;

[6]ratio of melt viscosity after 40 min heating at 410° C. at a shear rate of 46 s$^{-1}$ over melt viscosity after 10 minutes at 410° C. at same shear rate ($VR_{40}$);

[7]melt viscosity determined at a shear rate of 46 s$^{-1}$ after 10 min heating at 410° C.;

[8]Tensile strength at yield;

[9]elongation at yield;

[10]tensile strength at break;

[11]elongation at break;

[12]tensile modulus;

[13]Izod Impact Strength measured on specimens with a notch of 0.003'.

TABLE 4

| Run | Additive (% wt) | Extruder (rpm) | Extruder power (Amps) | Pressure (psi) | Calendering Roll (rpm) |
|---|---|---|---|---|---|
| Ex. 10C | none | ~25 | 10 | 1540-1710 | 21.5 |
| Ex. 11 | 2% | ~25 | 7.5 | 570-850 | 19 |
| Ex. 12 | 2% | ~180 | 8.5 | 500-700 | 19 |

Data embedded here above well demonstrate a dramatic improvement in processability when adding the polymer (F) additive to RADEL® R material.

Same test was repeated but targeting thinner sheets (thickness ~2 mm). Results obtained for RADEL® R PPSU-based compositions comprising additive from Ex. 1 are summarized in table 5.

TABLE 5

| Run | Additive (% wt) | Extruder (rpm) | Extruder power (Amps) | Pressure (psi) |
|---|---|---|---|---|
| Ex. 13C | none | ~40 | >20(*) | >2000(*) |
| Ex. 14 | 1% | ~40 | 10 | 500-600 |
| Ex. 15 | 0.5% | ~40 | 10 | 500-600 |

(*)The pressure and extruder power increased steadily until the maximum pressure limit was reached after about 5 minutes.

These data have demonstrated that while it is not possible to manufacture RADEL® R PPSU sheets of above mentioned thickness in these conditions without the use of an additive, as little as 0.5% wt of polymer (F) enables achievement of outstanding processability.

Spiral Flow Description

Spiral flow is a technique commonly used to assess the rheology of injection molding materials. According to this technique, a molten sample of blends as above described was injected at a fixed pressure into cavity of fixed cross section that radiated outward in a spiral direction from a central injection point. The length that the polymer melt flowed around the spiral prior to solidification gave an empirical measure of the rheological properties of the material. We used a Toyo 50 ton injection molding pressure to generate data summarized in table 6. The equipment was setup to deliver pressures of 10000 or 25000 psi into a spiral mold of 3/16 inch by 1/8 inch cross section.

TABLE 6

| | Additive | | Spiral flow length (inches) | |
|---|---|---|---|---|
| Run | type | (% wt) | At 10 kpsi | At 25 kpsi |
| Ex. 16C | none | | 4.9 | 12.1 |
| Ex. 17 | Ex. 1 | 1% | 5.6 | 12.1 |
| Ex. 18 | Ex. 1 | 2% | 5.8 | 12.8 |
| Ex. 19C | MFA | 2% | 5.8 | 12.8 |
| Ex. 20C | PFA | 2% | 5.8 | 12.5 |
| Ex. 21C | FKM | 2% | 5.4 | 12.8 |

Data provided here above show that the material containing polymer (F) added to RADEL® R PPSU flows better under injection molding conditions, because a longer flow length is achieved before the polymer solidifies in the spiral mold.

The invention claimed is:

1. A polymer composition comprising:
   at least one polycondensation polymer having a heat deflection temperature (HDT) of above 80° C. under a load of 1.82 MPa when measured according to ASTM D648 [polymer (P)];
   at least one perfluoropolyether block copolymer [polymer (F)] comprising:
   A) one or more (per)fluoropolyoxyalkylene segment (chain $R_f$), that is to say a segment comprising recurring units having at least one catenary ether bond and at least one fluorocarbon moiety, and
   B) one or more polyalkylene segment (chain $R_a$) comprising recurring units of formula: —($CR_1R_2$—$CR_3R_4$)— wherein $R_1$, $R_2$, $R_3$, $R_4$, equal to or different from each other, are selected from the group consisting of H, halogens; $C_1$-$C_6$ (hydro)carbon groups, optionally containing fluorine or other heteroatoms;
   wherein polymer (F) is present in an amount of at least 0.05 wt. % and at most 2 wt. % with respect to the total weight of polymer (F) and polymer (P).

2. The polymer composition of claim 1, wherein polymer (F) complies with formula (I):

$$T_1\text{-O-}[A\text{-}B]_z\text{-}[A\text{-}B']_{z'}\text{-}A\text{-}T_1' \quad \text{(formula I)}$$

wherein:
-A=-(X)$_a$—O-A'-(X')$_b$—, wherein A' is a chain comprising recurring units ($R_1$), said recurring units having general formula: —(CF$_2$)$_k$—CFZ—O—, wherein k is an integer of from 0 to 3 and Z is selected from the group consisting of a fluorine atom and a $C_1$-$C_6$ perfluoro(oxy)alkyl group; X, X', equal to or different from each other, are selected from the group consisting of —CF$_2$—, —CF$_2$CF$_2$—, and —CF(CF$_3$)—; a, b, equal to or different from each other, are integers equal to 0 or 1, with the proviso that the block A linked to the end group $T_1$-O— has a=1 and the block A linked to the end group $T_1'$ has b=0;

B is a segment of recurring units derived from one or more olefins having formula (Ia):

$$-[(CR_1R_2-CR_3R_4)_j(CR_5R_6-CR_7R_8)_{j'}]- \quad \text{(formula Ia)},$$

wherein: j is an integer from 1 to 100, j' is an integer from 0 to 100 with the proviso that (j+j') is higher than 2 and lower than 100; $R_1$, $R_2$, $R_3$, $R_4$, $R_5$, $R_6$, $R_7$, $R_8$, equal to or different from each other, are selected from the group consisting of halogen; H; and $C_1$-$C_6$ groups, optionally containing F or other heteroatoms, said substituents $R_1$-$R_8$ optionally containing one or more functional groups;

z is an integer higher than or equal to 2; z' is ≥0; and z, z' are such that the number average molecular weight of the polymer (F) of formula (I) is in the range of from 500 to 500,000;

B' is a segment otherwise complying with formula (Ia), but having at least one of the substituents $R_1$ to $R_8$ different than those in block B;

$T_1$ and $T_1'$, equal to or different from each other, are selected from the group consisting of H, halogen, $C_{1-3}$ (per)fluoroalkyls, $C_{1-6}$ alkyls and $C_1$-$C_{30}$ functional end groups comprising heteroatoms selected from the group consisting of O, S, and N.

3. The polymer composition of claim 2, wherein said polymer (F) complies with formula (I):

$$T_1\text{-O-}[A\text{-}B]_z\text{-}A\text{-}T_1' \quad \text{(formula I)}$$

wherein:
-A=-(X)$_a$—O-A'-(X')$_b$—, wherein X, a and b have the same meanings as defined in claim 2 and A' is a chain $R_f$ of formula:

$$-(CF_2CF_2O)_{a+}(CF_2O)_{b+}(CF_2(CF_2)_zCF_2O)_{c+}-,$$

wherein: $z^+$ is 1 or 2; a+, b+, c+ are integers $\geq 0$;

B is a segment of formula —[(CF$_2$—CF$_2$)$_{j+}$]— wherein: j+ is an integer from 2 to 100;

T$_1$ and T$_1$', equal to or different from each other, are selected from the group consisting of: —H; halogen; and C$_1$-C$_3$ perhalogenated alkyl group.

4. The polymer composition of claim 1, wherein said polymer (P) is selected from the group consisting of aromatic polyimides (PI), polyaryletherketones (PAEK), liquid crystal polymers (LCP), and aromatic sulfone polymers (SP).

5. The polymer composition of claim 4, wherein said polymer (P) is an aromatic polyimide (PI) comprising recurring units, wherein more than 50 wt. % of said recurring units comprising at least one aromatic ring and at least one imide group, said imide group being present as such (formula 1A) or in its auric acid form (formula 1B) [recurring units (R$_{PI}$)]:

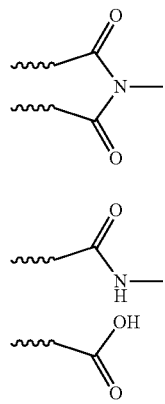

formula 1A formula 1B and wherein said recurring units (R$_{PI}$) are selected from formulae 5A to 5C:

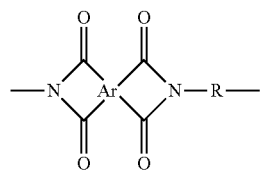

formula 5A

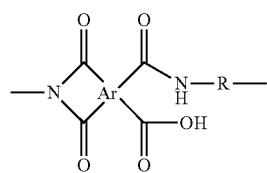

formula 5B

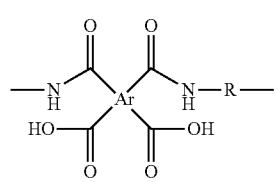

formula 5C wherein: Ar represents an aromatic tetravalent group.

6. The polymer composition of claim 4, wherein said polymer (P) is a polyaryletherketone (PAEK) polymer, comprising recurring units (R$_{PAEK}$), wherein more than 50 wt. % of said recurring units are recurring units with formulae selected from the group consisting of (k-A), (k-B), and (k-C):

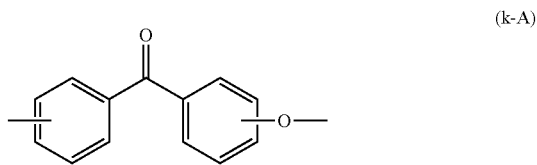

(k-A)

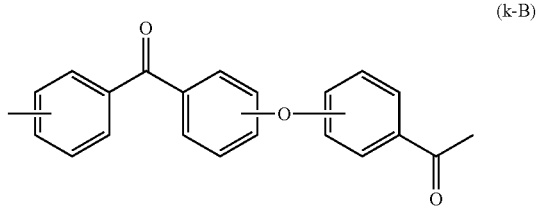

(k-B)

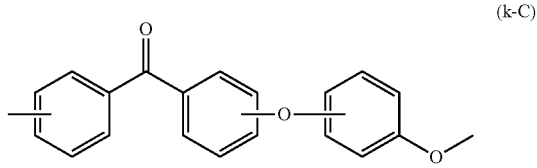

(k-C)

wherein the attachment of the ketone and/or ether groups to the aromatic ring in formulae (k-A), (k-B) and (k-C) represent, independently at each occurrence, each of the possible ortho, meta and para configurations.

7. The polymer composition of claim 4, wherein said polymer (P) is an aromatic sulfone polymer (SP), wherein at least 50% wt of the recurring units thereof comprise at least one group of formula (SP) [recurring units (R$_{SP}$)]:

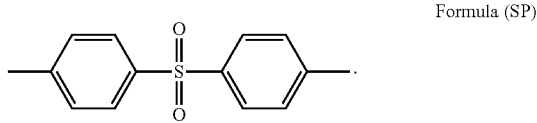

Formula (SP)

8. The polymer composition of claim 7, wherein at least 50% wt of the recurring units of aromatic sulfone polymer (SP) are recurring units (R$_{SP-1}$), in their imide form (R$_{SP-1}$-A) and/or amic acid forms [(R$_{SP-1}$-B) and (R$_{SP-1}$-C)]:

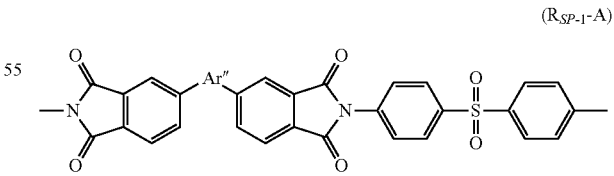

(R$_{SP-1}$-A)

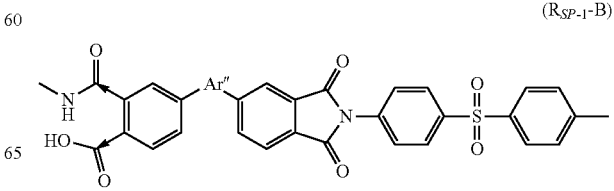

(R$_{SP-1}$-B)

($R_{SP-1}$-C)

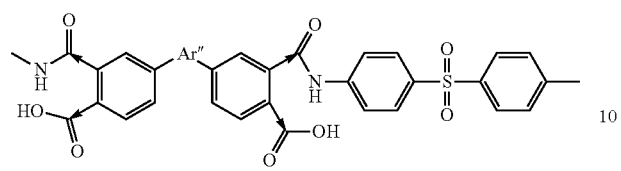

wherein: the → denotes isomerism so that in any recurring unit the groups to which the arrows point may exist as shown or in an interchanged position;

Ar" is selected from the group consisting of the following structures:

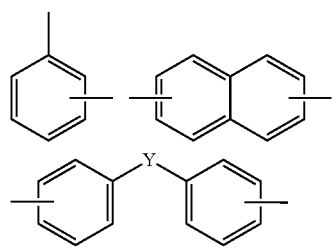

and corresponding optionally substituted structures, with Y being —O—, —C(O)—, —(CH$_2$)$_n$—, —C(CF$_3$)$_2$—, —(CF$_2$)$_n$—, with n being an integer from 1 to 5 and mixtures thereof.

9. The polymer composition of claim 7, wherein at least 50% wt of the recurring units of aromatic sulfone polymer (SP) are recurring units ($R_{SP-2}$) and/or recurring units ($R_{SP-3}$):

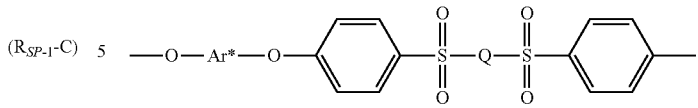

wherein: -Q and Ar*, equal or different from each other and at each occurrence, are independently a divalent aromatic group.

10. The polymer composition of claim 9, wherein recurring units ($R_{SP-2}$) are selected from the group consisting of:

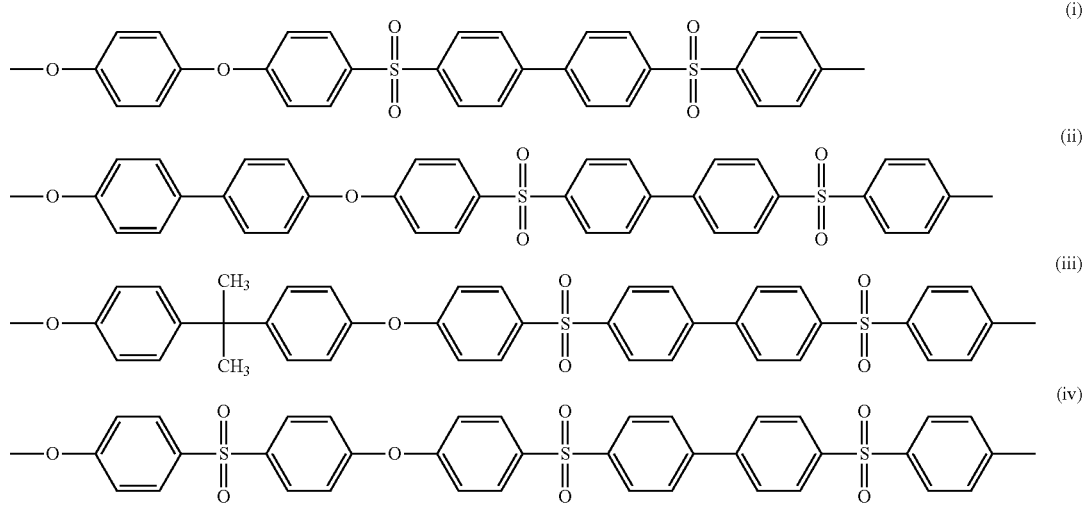

and mixtures thereof, and wherein recurring units ($R_{SP-3}$) are selected from the group consisting of:

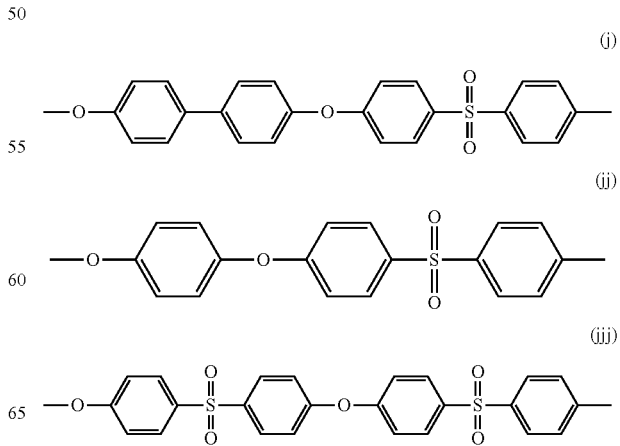

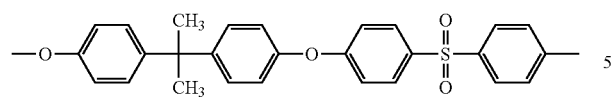

and mixtures thereof.

11. A process for manufacturing the polymer composition according to claim 1, which comprises mixing:
   at least one polymer (P); and
   at least one polymer (F).

12. The process of claim 11, wherein said polymer (P) and said polymer (F) are mixed by melt compounding.

13. A shaped article comprising the polymer composition according to claim 1.

14. The article of claim 13, being selected from the group consisting of an injection molded article, an extrusion molded article, a shaped article, a coated article, and a casted article.

* * * * *